United States Patent [19]
Uwabo et al.

[11] Patent Number: 5,933,295
[45] Date of Patent: Aug. 3, 1999

[54] MAGNETIC DISK DRIVE WITH CARRIAGE LOCK LEVER LOCKING MECHANISM

[75] Inventors: Tsuneo Uwabo, Hachiouji; Yoshihiro Okano; Eiichi Yoneyama, both of Atsugi; Yoshinori Tangi, Hachiouji, all of Japan

[73] Assignee: Mitsumi Electric Co., Ltd., Tokyo, Japan

[21] Appl. No.: 08/969,171

[22] Filed: Nov. 12, 1997

[30] Foreign Application Priority Data

Nov. 14, 1996 [JP] Japan .................................. 8-302767

[51] Int. Cl.⁶ .............................. G11B 5/54; G11B 17/04
[52] U.S. Cl. ........................................ 360/105; 360/99.06
[58] Field of Search .............................. 360/99.06, 99.02, 360/105

[56] References Cited

U.S. PATENT DOCUMENTS

| | | | |
|---|---|---|---|
| 4,987,506 | 1/1991 | Uehara | 360/99.06 |
| 5,060,101 | 10/1991 | Isomura | 360/99.06 |
| 5,278,819 | 1/1994 | Shimegi et al. | 360/99.06 |
| 5,668,683 | 9/1997 | Stone | 360/105 |
| 5,701,290 | 12/1997 | Okada | 369/244 |
| 5,715,118 | 2/1998 | Tacklind | 360/105 |
| 5,831,794 | 11/1998 | Uwabo et al. | 360/99.06 |

FOREIGN PATENT DOCUMENTS

| | | |
|---|---|---|
| 1-130328 | 5/1989 | Japan . |
| 2-046580 | 2/1990 | Japan . |
| 3-219474 | 9/1991 | Japan . |
| 4-061063 | 2/1992 | Japan . |

Primary Examiner—Craig A. Renner
Attorney, Agent, or Firm—Frishauf, Holtz, Goodman, Langer & Chick, P.C.

[57] ABSTRACT

A magnetic disk drive comprises a disk holder (10) for holding a magnetic disk, a carriage with a magnetic head mounted thereon, a linear motor for moving the carriage, a lock lever (52) for locking the carriage in cooperation with an ejecting operation of the magnetic disk held in the disk holder, and an eject lever (51) for ejecting the magnetic disk from the disk holder. The lock lever and the eject lever are integrally formed as a single unit. The magnetic disk drive further comprises a lock lever locking mechanism (60) for locking the lock lever in a locking state where the lock lever is locking the carriage.

5 Claims, 5 Drawing Sheets

MAGNETIC DISK DRIVE WITH CARRIAGE LOCK LEVER LOCKING MECHANISM

BACKGROUND OF THE INVENTION

This invention relates to a magnetic disk drive.

As well known, a magnetic disk drive is a device for carrying out data recording and reproducing operations to and from a flexible disk called a magnetic disk. In recent years, magnetic disks shaving an increased capacity have been developed. A typical magnetic disk has a storage capacity on the order between 1 Mbyte and 2 Mbyte (hereinafter called a normal capacity). In contrast, a magnetic disk having a storage capacity as large as 128 Mbyte (hereinafter called a large capacity) has already been developed. Following such remarkable increase in capacity of the magnetic disk, development has also been made of a magnetic disk drive for carrying out data recording and reproducing operations to and from the magnetic disk of the large capacity type.

In the following description, a magnetic disk drive capable of carrying out data recording and reproducing operations to and from the large-capacity magnetic disk alone will be referred to as a high-density dedicated magnetic disk drive. On the other hand, a magnetic disk drive capable of carrying out data recording and reproducing operations to and from the normal-capacity magnetic disk alone will be called a normal-density dedicated magnetic disk drive. A magnetic disk drive capable of carrying out data recording and reproducing operations to and from both the large-capacity and the normal-capacity magnetic disks will be called a high-density/normal-density magnetic disk drive. The high-density dedicated magnetic disk drive and the high-density/normal-density magnetic disk drive may collectively be called a high-density magnetic disk drive.

The normal-density dedicated magnetic disk drive and the high-density magnetic disk drive are different in mechanism from each other. One of the major differences resides in a carriage drive source for driving a carriage holding a magnetic head. The carriage drive source is for moving the carriage with respect to the magnetic disk inserted in the magnetic disk drive in a predetermined radial direction of the magnetic disk. Specifically, the normal-density dedicated magnetic disk drive uses a stepping motor as the carriage drive source. The stepping motor has a rotation shaft with a lead screw. On the other hand, the high-density magnetic disk drive uses a linear motor such as a voice coil motor (VCM) as the carriage drive source.

Now, description will be made in detail as regards the voice coil motor used as the carriage drive source in the high-density magnetic disk drive. The voice coil motor is arranged at a rear side of the carriage. The voice coil motor comprises a pair of voice coils located at both sides of the carriage and a pair of magnetic circuits for producing magnetic fields in a direction intersecting electric currents flowing through the voice coils. Each voice coil is wound around a drive shaft extending in parallel to the predetermined radial direction of the magnetic disk and is movable along the drive shaft. When the electric current is made to flow through each of the voice coils in a direction intersecting the magnetic field produced by the magnetic circuit, drive force is generated in the voice coil in an extending direction of the drive shaft as a result of interaction between the electric current and the magnetic field. By the drive force, the voice coil motor makes the carriage move in the predetermined radial direction.

In the meanwhile, it is sometimes desired to transport the magnetic disk drive to another place. In this case, the carriage must be locked in order to prevent the carriage from being dislocated even if the magnetic disk drive is shaken during transportation. In the normal-density dedicated magnetic disk drive using the stepping motor as the carriage drive source, the lead screw of the stepping motor advantageously serves as a carriage locking mechanism. On the other hand, in the high-density magnetic disk drive, the carriage is freely movable in the predetermined radial direction because the linear motor such as the voice coil motor is used as the carriage drive source. Thus, in the high-density magnetic disk drive, the carriage is often dislocated due to the shaking movement during transportation and undesirably collides against other components at starting ends or terminating ends of the drive shafts.

In order to avoid the dislocation and the collision of the carriage, it is a general approach to insert a dummy diskette (magnetic disk) into the high-density flexible disk drive when it is transported. In this manner, the carriage is prevented from being dislocated even if the high-density magnetic disk drive is shaken during transportation.

In the above-mentioned approach, however, it is troublesome to manually insert the dummy diskette into the high-density magnetic disk drive every time it is transported. Sometimes, the dummy diskette is inadvertently not properly inserted into the high-density magnetic disk drive. In this event, the carriage can be freely dislocated when the high-density magnetic disk drive is shaken during transportation.

SUMMARY OF THE INVENTION

It is therefore an object of this invention to provide a magnetic disk drive which is capable of automatically and reliably locking a carriage upon ejection of a magnetic disk without inserting a dummy diskette into the magnetic disk drive.

A magnetic disk drive to which this invention is applicable comprises a disk holder for holding a disk-shaped magnetic recording medium, a carriage with a magnetic head mounted thereon to carry out data recording and reproducing operations to and from the magnetic recording medium, a linear motor for moving the carriage in a predetermined radial direction of the magnetic recording medium, a lock lever for locking the carriage at a predetermined position in cooperation with an ejecting operation of the magnetic recording medium held in the disk holder, and an eject lever for ejecting the magnetic recording medium from the disk holder.

According to an aspect of this invention, the lock lever and the eject lever are integrally formed as a single unit. The magnetic disk drive further comprises a lock lever locking mechanism for locking the lock lever at the predetermined position while the lock lever is locking the carriage.

DESCRIPTION OF THE PREFERRED EMBODIMENT

Figure 1:
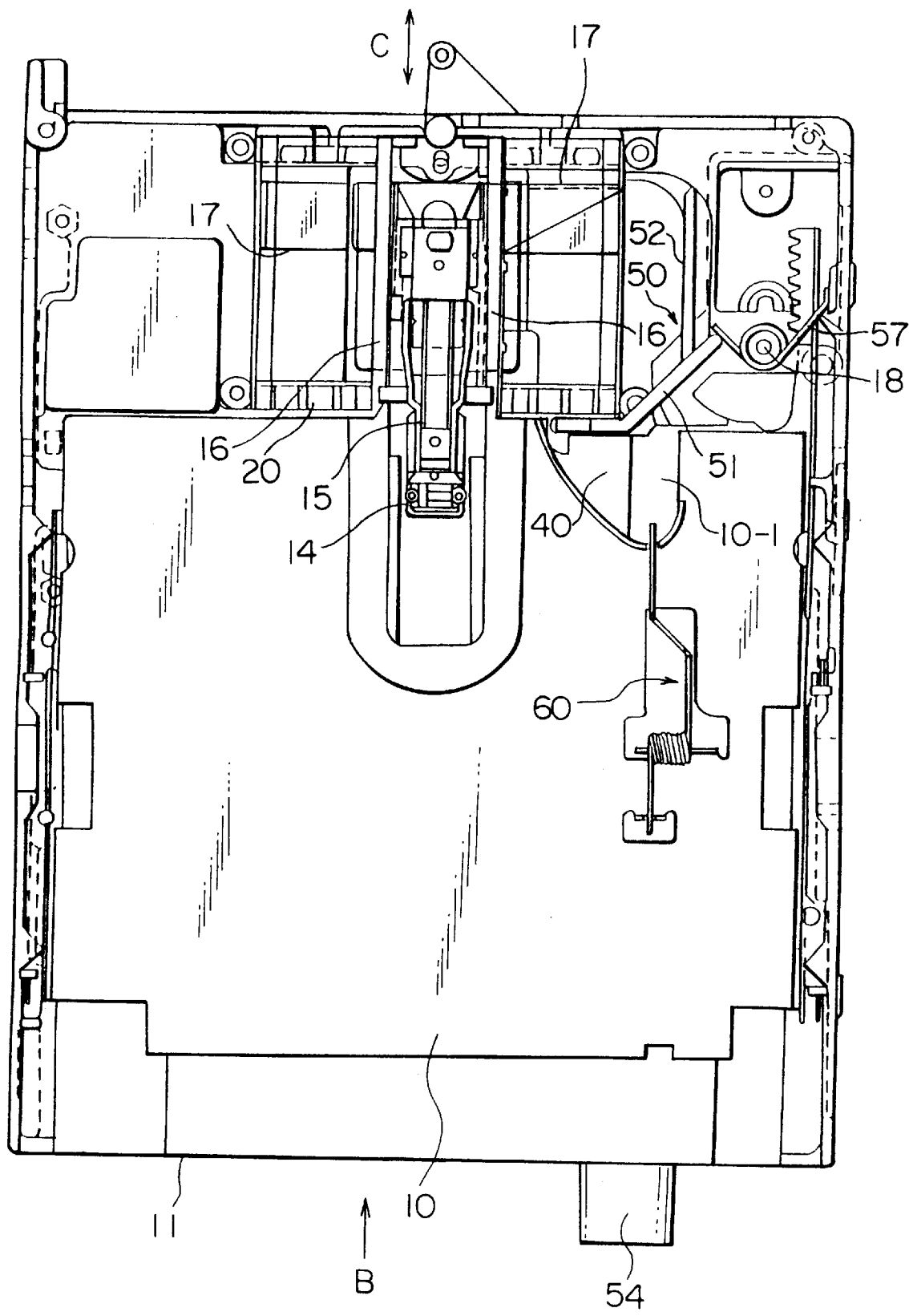
FIG. 1 is a plan view showing an internal structure of a magnetic disk drive according to a preferred embodiment of this invention.

Referring to FIG. 1, description will at first be made with respect to a magnetic disk drive with a carriage locking mechanism. The magnetic disk drive carries out data recording and reproducing operations to and from a magnetic disk and is adapted for use as a high-density magnetic disk drive. The magnetic disk depicted at 40 is inserted into a disk holder 10 of the magnetic disk drive in a direction depicted by an arrow B in FIG. 1. The magnetic disk 40 inserted into the disk holder 10 is held on a disk table assembly (not shown) rotatably supported on a principal surface of a main board 11. The disk table assembly is rotated by a drive motor (not shown) formed on a rear surface of the main board 11. As a consequence, a magnetic disk medium in the magnetic disk 40 is rotated together with the disk table assembly. To a rear surface of the main board 11, a printed board (not shown) with a number of electronic components mounted thereon is attached.

The magnetic disk drive comprises a magnetic head (not shown) for writing and reading data into and from the magnetic disk 40. The magnetic head is held through a gimbal 14 on a carriage 15. A combination of the magnetic head, the gimbal 14, and the carriage 15 will be called a carriage assembly. The carriage 15 is arranged above the principal surface of the main board 11 with a space kept from the main board 11. The carriage 15 holds the magnetic head so that the magnetic head is movable with respect to the magnetic disk 40 in a predetermined radial direction thereof (depicted by an arrow C in FIG. 1). The carriage 15 is supported at lower ends of both sides thereof on a pair of guide bars 16 extending in parallel to the predetermined radial direction C and is guided by the guide bars 16.

The carriage 15 is driven in the predetermined radial direction C by a voice coil motor which will hereinafter be described. Specifically, the voice coil motor is arranged at a rear side of the carriage 15. The voice coil motor comprises a pair of voice coils 17 located at both sides of the carriage 15, and a pair of magnetic circuits 20 for generating magnetic fields in a direction intersecting electric currents flowing through the voice coils 17. Each voice coil 17 is wound around a drive shaft extending in parallel to the predetermined radial direction C and is movable along the drive shaft. Each of the magnetic circuits 20 comprises a permanent magnet and a yoke. In the voice coil motor having the above-mentioned structure, let the electric current flow through each of the voice coils 17 in a direction intersecting the magnetic field generated by the magnetic circuit 20. In this event, drive force is generated in the voice coil 17 in an extending direction of the drive shaft as a result of interaction between the electric current and the magnetic field. By the drive force, the voice coil motor makes the carriage 15 move in the predetermined radial direction C.

Figure 2:
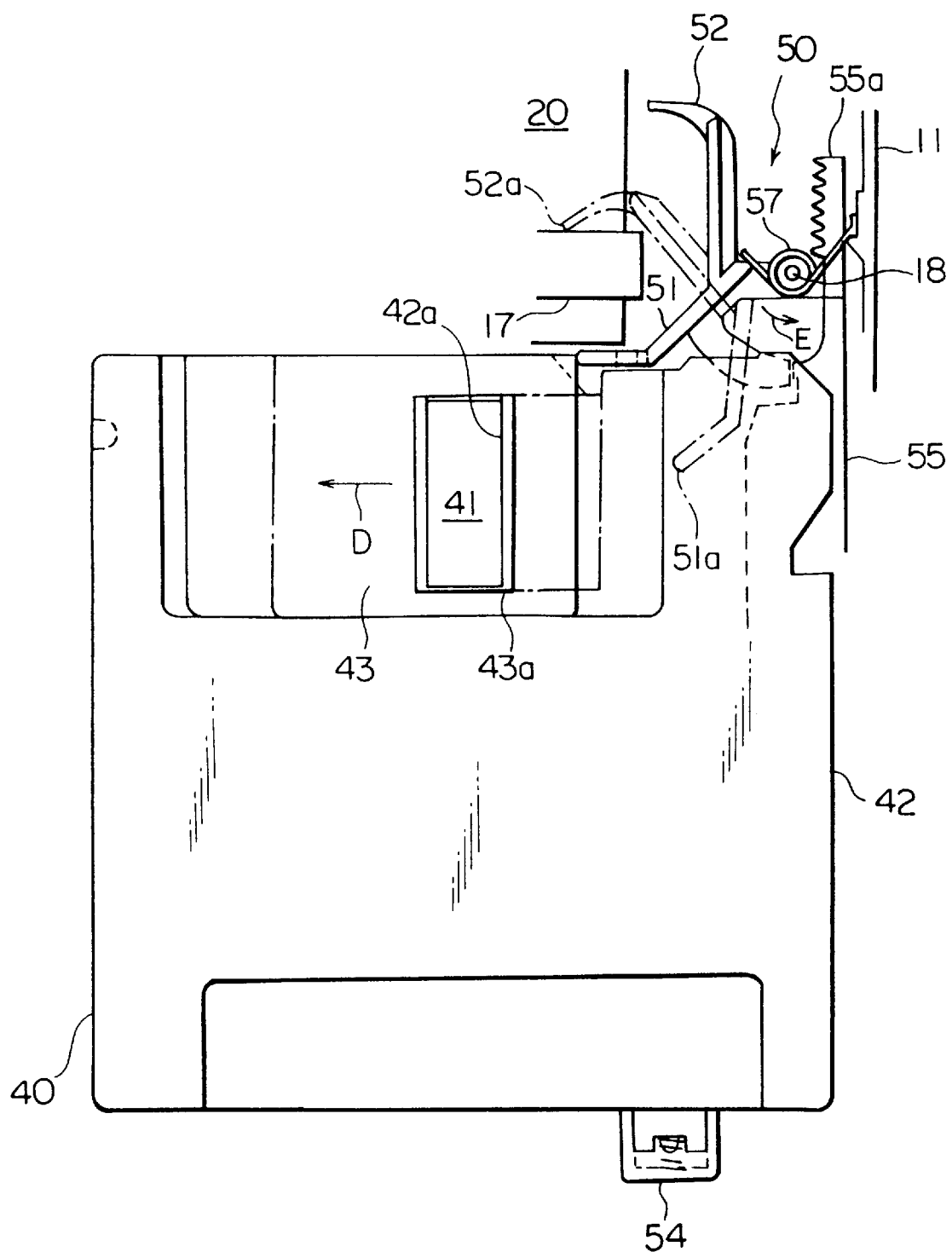
FIG. 2 is a plan view showing the relationship between a carriage locking mechanism in FIG. 1 and a magnetic disk.

Referring to FIG. 2, the carriage locking mechanism is illustrated together with the magnetic disk 40. In the figure, the magnetic disk 40 is inserted into the magnetic disk drive illustrated in FIG. 1. The magnetic disk 40 comprises a disk-shaped magnetic disk medium 41, a case 42 covering the magnetic disk medium 42, and a shutter 43 slidable in a direction depicted by an arrow D. A pair of upper and lower openings 42a are formed in upper and lower surfaces of the case 42, respectively, although the upper surface alone is illustrated in the figure. The shutter 43 comprises upper and lower plate members for opening and closing the upper and the lower openings 42a, respectively. A window 43a is formed in each of the upper and the lower plate members although the upper plate member alone is illustrated. The shutter 43 is urged by a spring (not shown) in a direction opposite to the direction D. When the shutter 43 is slid in the direction D, the windows 43a of the shutter 43 are positioned at the openings 42a formed in the case 42. As a consequence, the magnetic disk medium 41 becomes accessible to the magnetic head through the openings 42a.

The magnetic disk drive comprises a shutter drive mechanism for driving the shutter 43 of the magnetic disk 40, an ejector mechanism for ejecting the magnetic disk 40 from the magnetic disk drive, a carriage locking mechanism for locking the carriage 15 after the magnetic disk 40 is ejected, and a lock lever locking mechanism.

Figure 3:
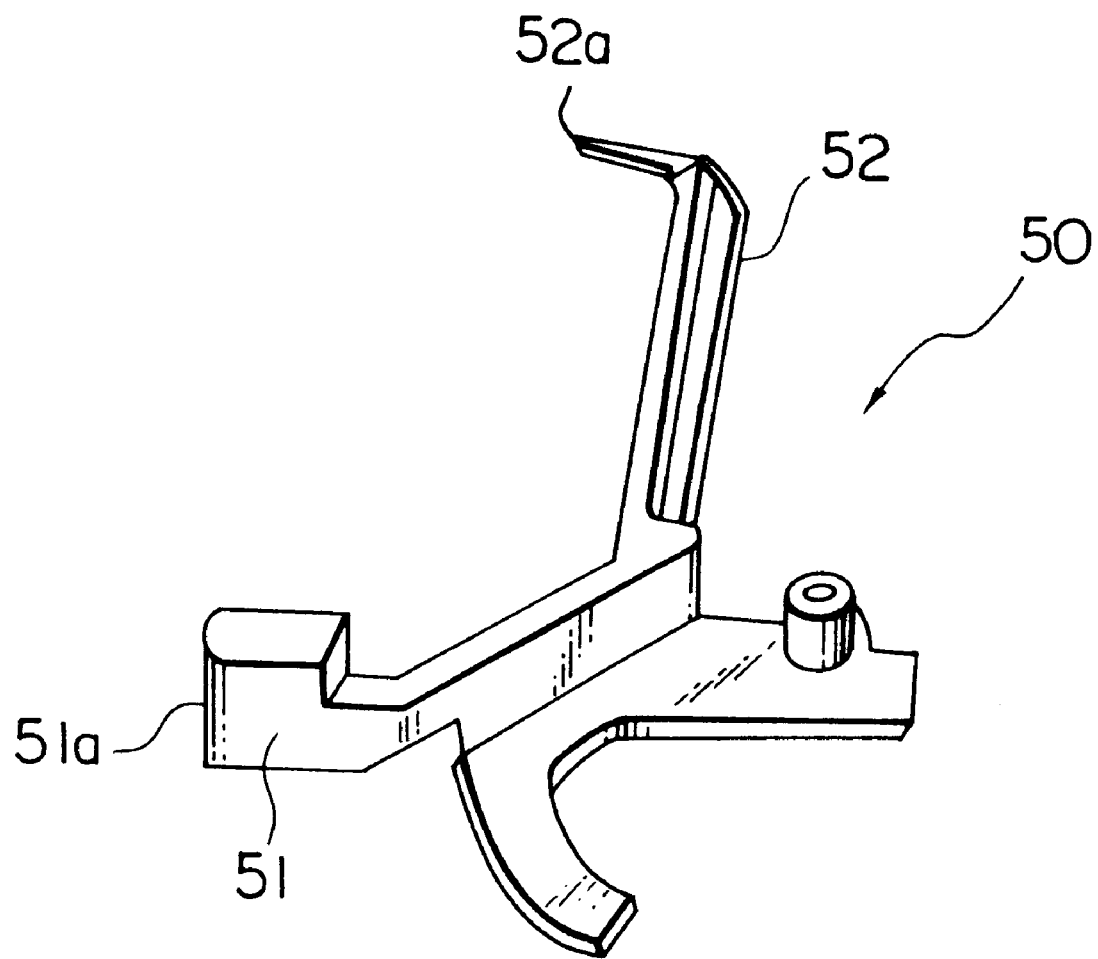
FIG. 3 is a perspective view of a lever unit illustrated in FIG. 1.

Referring to FIG. 3, a lever unit 50 comprises an eject lever 51 and a lock lever 52. The eject lever 51 serves both as the shutter drive mechanism for driving the shutter 43 and the ejector mechanism for ejecting the magnetic disk 40 from the magnetic disk drive. The lever unit 50 is attached to the main board 11 to be rotatable around a support shaft 18. As will later be described in detail, the eject lever 51 has a top end 51a to be engaged with the disk holder 10 (FIG. 1). When the magnetic disk 40 is inserted into the disk holder 10, the top end 51a of the eject lever 51 is rotated in contact with a forward end of the magnetic disk 40 to move the shutter 43. On the other hand, upon ejection of the magnetic disk 40, the eject lever 51 is forced by urging force of a spring mechanism 57 to be rotated in a counterclockwise direction so that the top end 51a serves to eject the magnetic disk 40 from the disk holder 10. In order to secure a rotation space of the top end 51a required in the above-mentioned operations, the disk holder 10 is provided with a notch 10-1 as illustrated in FIG. 1. The lock lever 52 is arranged in the vicinity of the carriage 15 and serves to lock the carriage 15 upon ejection of the magnetic disk 40. The lever unit 50 is integrally formed by a nonmagnetic material such as resin.

The ejector mechanism comprises an eject button 54 projecting from an outer surface of a front bezel (not shown) of the magnetic disk drive, the disk holder 10 for holding the magnetic disk 40 inserted through a slot (not shown) formed in the front bezel, and an eject spring having one end engaged with an eject plate 55 and the other end engaged with the disk holder 10. The eject plate 55 has a rack 55a formed at its inner top end. The rack 55a is engaged with a pinion (not shown) rotatably supported on the principal surface of the main board 11.

Before the magnetic disk 40 is inserted, the lever unit 50 is located at an initial position depicted by a dash-and-dot line in FIG. 2. This position is defined by an edge of the notch 10-1 of the disk holder 10. In this state, the lever unit 50 is urged by the spring mechanism 57 in a counterclockwise direction depicted by an arrow E.

Now, it is assumed here that the magnetic disk 40 is inserted into the magnetic disk drive in the above-mentioned state. When the magnetic disk 40 is pushed in the direction B in FIG. 1, the top end 51a of the eject lever 51 is engaged with an upper end of a right side edge of the shutter 43. Following the movement of the magnetic disk 40, the lever unit 50 is rotated in a clockwise direction. As a consequence, the shutter 43 is forced by the top end 51a of the eject lever 51 to move in the direction D.

When the magnetic disk 40 is completely received in the magnetic disk drive, the magnetic disk 40 is held in the disk holder 10 by a disk locking mechanism which is not illustrated in the figure. In this state, the window 43a of the shutter 43 is located right above the opening 42a of the case 42. The shutter 43 is urged by a spring member (not shown) to be located at a position depicted by a dash-and-dot line in FIG. 2.

In the above-mentioned state, it is assumed that the eject button 54 is pressed in order to eject the magnetic-disk 40 from the magnetic disk drive. In this event, the magnetic disk 40 is unlocked or released from the disk locking mechanism. Specifically, engagement between the lever unit 50 and the ejector plate 55 is released so that the disk holder 10 is moved upward in the figure. As a result, the eject lever 51 is rotated by the urging force of the spring mechanism 57 to protrude a part of the magnetic disk 40 from the disk holder 10. Thus, the magnetic disk 40 can be removed from the disk holder 10.

Simultaneously, the lock lever 52 is rotated by the urging force of the spring mechanism 57 in the counterclockwise direction E to lock the carriage 15. Specifically, a top end 52a of the lock lever 52 is engaged with the voice coils 17 to move the carriage 15 in the direction opposite to the direction B (FIG. 1). In this event, the movement of the voice coils 17 is restricted by end portions of the drive shafts of the magnetic circuits 20. Therefore, the movement of the carriage 15 is also restricted.

As described above, the carriage 15 is locked in cooperation with the ejecting operation of the magnetic disk 40. As a consequence, the carriage 15 is prevented from substantial movement even if the magnetic disk drive is shaken while it is transported.

However, the lock lever 52 is only urged by the spring mechanism 57. During transportation, the magnetic disk drive may possibly be subjected to a great impact. Furthermore, during transportation, the magnetic disk drive may be positioned with its rear end down. In this event, the carriage 15 can be moved because its own weight overcomes the urging force of the spring mechanism 57.

According to this invention, the magnetic disk drive further comprises the lock lever locking mechanism in addition to the above-mentioned carriage locking mechanism. The lock lever locking mechanism serves to lock the lock lever 52 through the eject lever 51 while the lock lever 52 is in a locking state.

Figure 4:
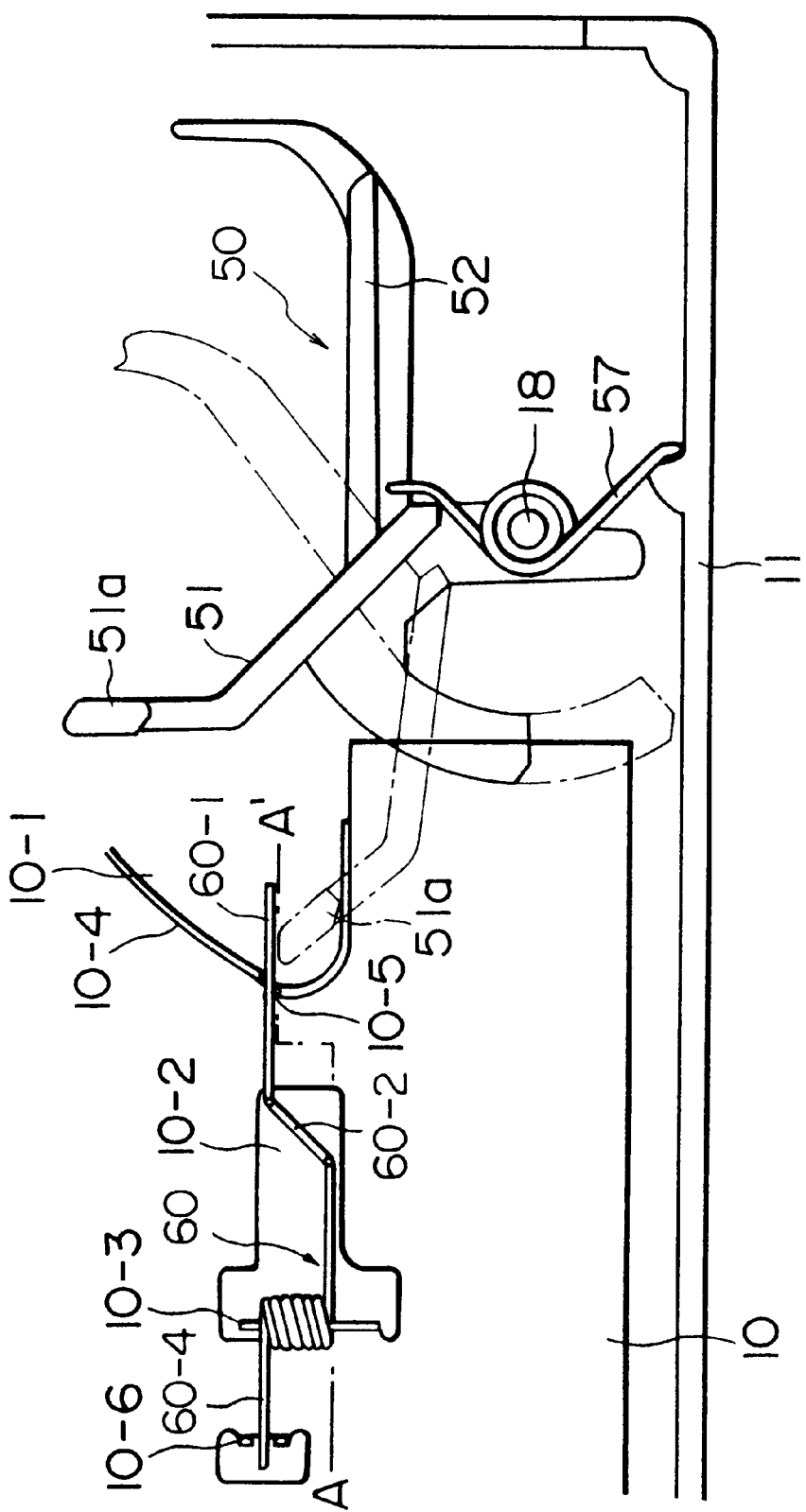
FIG. 4 is a plan view of a lock lever locking mechanism according to this invention together with the carriage locking mechanism.
Figure 5:
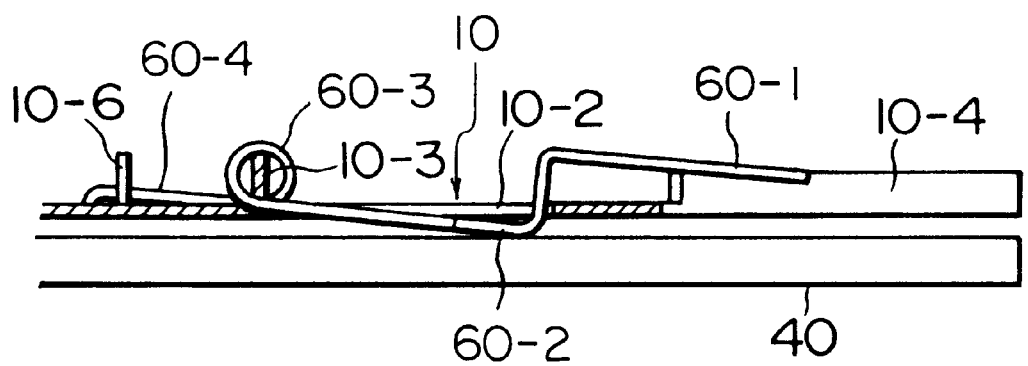
FIG. 5 is a sectional view taken along a line A–A' in FIG. 4 in a state where the magnetic disk is inserted.
Figure 6:
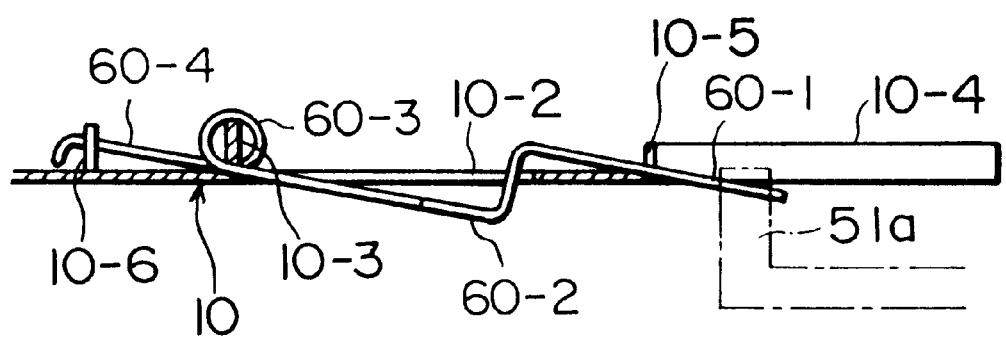
FIG. 6 is a sectional view taken along a line A–A' in FIG. 4 in a state where no magnetic disk is inserted.

Referring to FIGS. 4 through 6 the lock lever locking mechanism will be described. The lock lever locking mechanism depicted at 60 is formed by a wire member. The lock lever locking mechanism 60 comprises a first engaging portion 60-1 engageable with the top end 51a of the eject lever 51 in the locking state, a second engaging portion 60-2 engageable with the magnetic disk 40 held in the disk holder 10, and a spring mechanism portion 60-3 formed by a coil spring. The first, the second, and the third engaging portion 60-1, 60-2, and 60-3 are integrally formed as a single unit. The lock lever locking mechanism 60 is urged downward by the spring mechanism portion 60-3. In order to make the second engaging portion 60-2 engageable with the magnetic disk 40, the disk holder 10 is provided with an opening 10-2. At the edge of the opening 10-2 of the disk holder 10, a support piece 10-3 is formed by a cut-and-bend process. The lock lever mechanism 60 is supported by inserting the support piece 10-3 into a coil section of the spring mechanism portion 60-3.

In the state illustrated in FIG. 5, the magnetic disk 40 is held in the disk holder 10. In this state, the second engaging portion 60-2 is engaged with the magnetic disk 40 while the first engaging portion 60-1 is apart from the top end 51a of the eject lever 51. When the magnetic disk 40 is ejected from the disk holder 10 as illustrated in FIG. 6, the first engaging portion 60-1 is responsive to the urging force of the spring mechanism portion 60-3 to move down to a lower position where the first engaging portion 60-1 is engaged with the top end 51a of the eject lever 51. To this end, the wire member is bent at its intermediate portion to form an L shape so that the first engaging portion 60-1 is located slightly above the second engaging portion 60-2. Furthermore, a rising portion 10-4 is formed at the edge of the notch 10-1 of the disk holder 10 and provided with a cut 10-5. The cut 10-5 serves to guide the vertical movement of the first engaging portion 60-1.

In addition, the second engaging portion 60-2 is formed by bending and shaping the wire member so as to be brought into contact with the magnetic disk 40 substantially in a line-to-line fashion. This aims to prevent the surface of the magnetic disk 40 from being damaged by the second engaging portion 60-2 when the magnetic disk 40 is repeatedly inserted and ejected. The above-mentioned structure is realized by bending the wire member to form an oblique portion inclined from the moving direction of the magnetic disk 40. Furthermore, the wire member is extended in a direction opposite to the second engaging portion 60-2 to form an extended portion 60-4. On the other hand, the disk holder 10 is provided with a support portion 10-6 formed by a cut-and-bend process. The extended portion 60-4 is supported by the support portion 10-6.

Now, an operation of the lock lever locking mechanism 60 will be described. When the lever unit 50 is in a state depicted by the dash-and-dot line in FIG. 4, the first engaging portion 60-1 locks the top end 51a of the eject lever 51. In this state, the rotation of the eject lever 51 in the clockwise direction is prevented. This means that the locking state of the lock lever 52 is locked. When the magnetic disk 40 is inserted into the disk holder 10, the magnetic disk 40 is brought into contact with the second engaging portion 60-2 to move the second engaging portion 60-2 upward. In this event, the first engaging portion 60-1 is moved upward. As a result, the top end 51a of the eject lever 51 is unlocked or released from the first engaging portion 60-1. Therefore, the eject lever 51 is rotated in the clockwise direction.

FIG. 5 shows the state after the magnetic disk 40 is inserted. When the magnetic disk 40 is ejected from the disk holder 10, the top end 51a of the eject lever 51 is returned to the initial position to be locked by the notch 10-1 of the disk holder 10, before the second engaging portion 60-2 is separated from the magnetic disk 40. When the second engaging portion 60-2 is separated from the magnetic disk 40, the first engaging portion 60-1 is moved downward to lock the top end 51a of the eject lever 51. This state is depicted by the dash-and-dot line in FIG. 4 and is also shown in FIG. 6.

As described above, the lock lever locking mechanism 60 locks the top end 51a of the eject lever 51 to prevent the rotation of the lock lever 52 in the clockwise direction. Therefore, during transportation of the magnetic disk drive, the carriage 15 is never dislocated even if the magnetic disk drive is subjected to a great impact. In addition, the carriage 15 is never dislocated even if the magnetic disk drive is positioned with its rear end down during transportation. Thus, the magnetic disk drive with the lock lever locking mechanism according to this invention is durable against the impact.

In this embodiment, the carriage 15 being locked is always located at a position faced to a front end of the magnetic disk drive. Therefore, driving torque of the drive motor can be reduced upon insertion of the magnetic disk 40. Since the lock lever 52 and the eject lever 51 are integrally formed into the lever unit 50, the cost is saved as compared with the case where the lock lever and the eject lever are formed as separate components.

It will readily be understood that this invention is not restricted to the foregoing embodiment but can be modified in various other manners within the scope of the appended claims. For example, in the foregoing embodiment, the carriage is locked at the position faced to the front end of the magnetic disk drive upon ejection of the magnetic disk. Alternatively, the carriage can be locked at a position faced to the rear end of the magnetic disk drive.

What is claimed is:

1. A magnetic disk drive comprising:
    a disk holder for holding a disk-shaped magnetic recording medium;
    a carriage with a magnetic head mounted thereon to carry out data recording and reproducing operations to and from said magnetic recording medium;
    a linear motor for moving said carriage in a predetermined radial direction of said magnetic recording medium;
    a lock lever for locking said carriage at a predetermined position in cooperation with an ejecting operation of said magnetic recording medium held in said disk holder; and
    an eject lever for ejecting said magnetic recording medium from said disk holder;
    said lock lever and said eject lever being integrally formed as a single unit; and
    said magnetic disk drive further comprising a lock lever locking mechanism attached to said disk holder for locking said lock lever through said elect lever at said predetermined position in a locking state where said lock lever is locking said carriage.

2. A magnetic disk drive as claimed in claim 1, wherein:
    said lock lever locking mechanism comprises a wire member attached to said disk holder;
    said wire member includes a first engaging portion engageable with a predetermined portion of said eject lever in said locking state, and a second engaging portion engageable with said magnetic recording medium held in said disk holder;
    said wire member is urged downward by a spring mechanism;
    said second engaging portion is engaged with said magnetic recording medium with said first engaging portion separated from the predetermined portion of said eject lever when said magnetic recording medium is held in said disk holder; and
    said first engaging portion is moved downward to a lower position to be engaged with the predetermined portion of said eject lever when said magnetic recording medium is ejected from said disk holder.

3. A magnetic disk drive as claimed in claim 2, wherein said second engaging portion is formed by bending said wire member so as to be brought into line contact with said magnetic recording medium.

4. A magnetic disk drive as claimed in claim 2, wherein said spring mechanism comprises a coil spring, and said lock lever locking mechanism comprises a combination of said wire member and said coil spring integrally formed as a single unit.

5. A magnetic disk drive as claimed in claim 4, wherein said second engaging portion is formed by bending said wire member so as to be brought into line contact with said magnetic recording medium.

* * * * *